United States Patent [19]
Diamondstein et al.

[11] Patent Number: 6,064,712
[45] Date of Patent: May 16, 2000

[54] AUTORELOAD LOOP COUNTER

[75] Inventors: Marc Stephen Diamondstein, Allentown; Mohit Kishore Prasad, Bethlehem, both of Pa.

[73] Assignee: Lucent Technologies Inc., Murray Hill, N.J.

[21] Appl. No.: 09/158,927

[22] Filed: Sep. 23, 1998

Related U.S. Application Data

[60] Provisional application No. 60/067,467, Dec. 4, 1997.

[51] Int. Cl.[7] ................................................ G06M 3/00

[52] U.S. Cl. .................................. 377/15; 377/16; 377/56

[58] Field of Search .................................. 377/15, 16, 56

[56] References Cited

U.S. PATENT DOCUMENTS

| | | | |
|---|---|---|---|
| 4,636,967 | 1/1987 | Bhatt et al. | 377/15 |
| 5,646,974 | 7/1997 | Wu et al. | 377/15 |
| 5,991,355 | 11/1999 | Dahlke | 377/16 |

*Primary Examiner*—Margaret R. Wambach
*Attorney, Agent, or Firm*—David L. Smith

[57] ABSTRACT

There is disclosed a loop counter reload circuit loads an initial count value into a counter and a shadow register. A count value output from the counter is changed by a predetermined displacement resulting in a changed count value. The count value from the shadow register is loaded into the counter if the changed count value has reached a predetermined reference value, and otherwise the changed count value is loaded into the counter.

25 Claims, 1 Drawing Sheet

AUTORELOAD LOOP COUNTER

Priority from U.S. Provisional Application Ser. No: 60/067467, filed Dec. 4, 1997 is hereby claimed.

TECHNICAL FIELD

This application relates to loop counters for microprocessors and digital signal processors, and in particular to specialized circuitry and method for reloading loop counters.

BACKGROUND OF THE INVENTION

Many applications performed on microprocessors or digital signal processors require repeating computational steps for a predetermined number of repetitions, or until a predetermined condition is met. Repeating a step or sequence of steps is referred to as a loop. The number of time a loop is executed is tracked by a loop counter that counts the number of time the computation in the loop has been performed.

When loops are nested, the inner loop in the case of two nested loops, or the inner loops in the case of more than two nested loops, is/are repeated until the outermost loop has executed a predetermined number of times. Each time an inner loop counts through its associated predetermined number of count times, an outer loop counter is updated, such as being decremented, the inner loop counter is reset to a predetermined value, and the inner loop repeatedly executed the number of times of the predetermined value.

Software techniques have typically been used to reload loop counters in microprocessors. While only a few instruction cycles are required for each software counter reload operation, a detrimental impact on the processor performance occurs. Implementation of loop counter reloading in hardware can obviate the detrimental impact on processor performance.

SUMMARY OF THE INVENTION

In accordance with the present invention, a loop counter reload circuit loads an initial count value into a counter and a shadow register. A count value output from the counter is changed by a predetermined displacement resulting in a changed count value. The count value from the shadow register is loaded into the counter if the changed count value has reached a predetermined reference value, and otherwise the changed count value is loaded into the counter.

DETAILED DESCRIPTION

Figure 1:
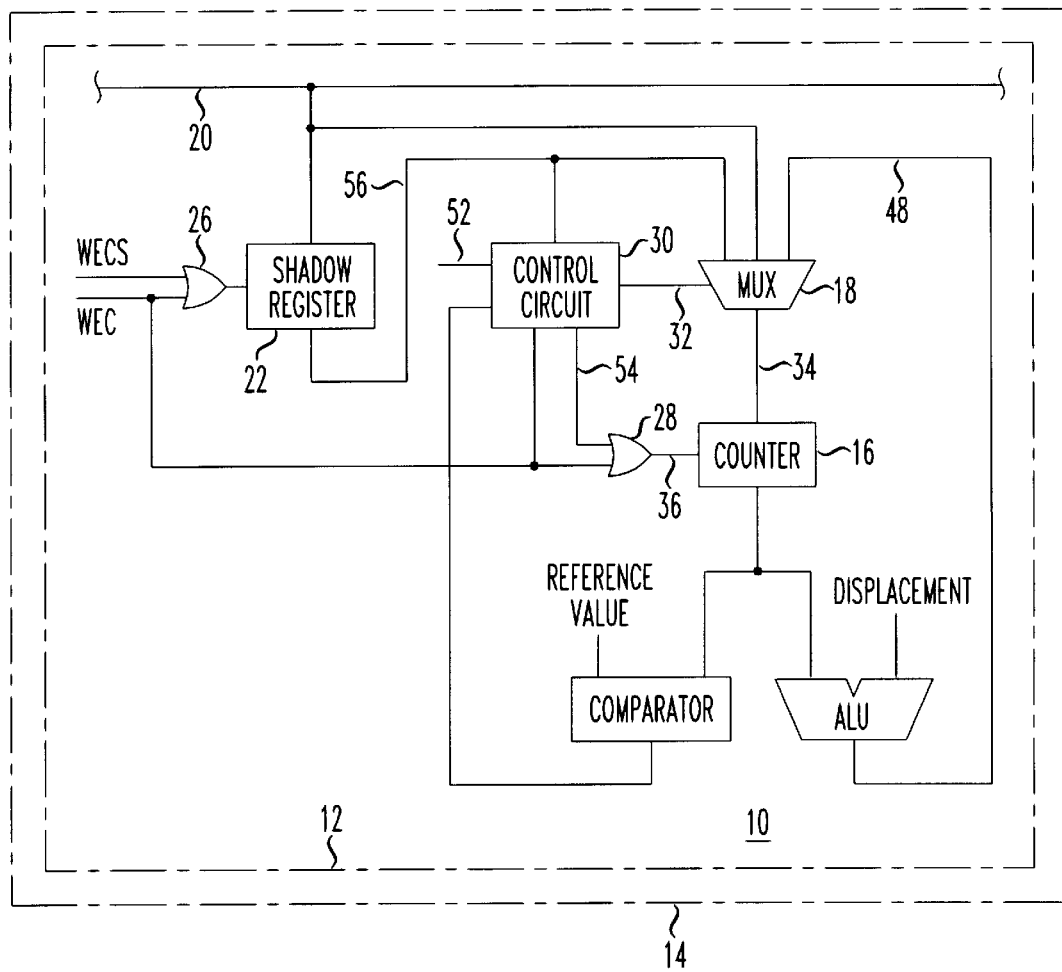
FIG. 1 is a loop counter reset circuit portion of an arithmetic unit, in accordance with illustrative embodiment of the present invention.

FIG. 1 illustrates a loop counter circuit 10 as a portion of an arithmetic unit 12 which may be fabricated in an integrated circuit 14. The loop counter reset circuit of the present invention may be used in loop counter control in, for example, microprocessors, microcontrollers, or digital signal processors.

Counter 16 is a register that retains the current count value. Counter 16 is configured in FIG. 1 as a count-down counter when the reference value 38 is less than the initial value written into counter 16 and the displacement 40 in conjunction with the arithmetic logic unit (ALU) 42 decreases the current count value output from counter 16. While a count-down counter will be described here, it is understood that with the appropriate setting of reference value 38 being greater than the initial value written into counter 16, and the displacement 40 in conjunction with ALU 42 increasing the current count value output from counter 16 a resettable loop counter 10 configured as an up-counter would result.

An initial count value is loaded into counter 16 by way of multiplexer 18 from databus 20. The same count value may be simultaneously loaded into shadow register 22. With the write enable counter shadow register signal, WECS, in a first state such as high, data on bus 20 is written to shadow register 22. When the write enable signal, WEC, is high the data oil bus 20 is written simultaneously to both shadow register 22 and counter 16. Thus, shadow register 22 may be written to independently of writing to counter 16. The write enable of shadow register 22 is enabled when either input to OR gate 26 is high. The write enable of counter 16 is enabled when either input to OR gate 28 is high.

The write enable signal, WEC, being high provides a high input to control circuit 30 and OR gate 28 that causes control circuit 30, through select input 32, to provide as the output 34 of multiplexer 18 the data on databus 20. A high input to OR gate 28 also causes output 36 to enable counter 16 such that the output 34 of multiplexer 18 is written to counter 16 overwriting any value then present in counter 16.

With loop counter circuit 10 operating as a count-down counter, reference value 38 is typically set to zero and displacement 40 is typically set to minus one, although the invention is not limited thereto. With an initial count value stored in counter 16, at the end of an outer loop, the counter output from counter 16, which is a current counter value, is provided as an input to both ALU 42 and comparator 46.

ALU 42 combines, such as by adding, the displacement with input 44 to provide an output that is a changed count value 48. When the displacement is negative, or a positive displacement is subtracted from input 44, the changed count value 48 is the current count value 44 less the magnitude of the displacement. Changed count value is provided as an input to multiplexer 18. An adder may replace ALU 42, as is known in the art, to receive input 44 as well as displacement 40 and produced changed count value 48.

Comparator 46 receives the current counter value 44 and reference value 38 as inputs. Comparator 46 compares the current counter value to the reference value and provides an output 50 that takes on a first state, such as a logic zero, when the output current counter value is not the same as the reference value and provides an output that takes on a second state, such as a logic one, when the current counter value 44 and the reference value 38 are the same. When the current counter value 44 and the reference value 38 are the same, the counter has counted down to the reference value and the shadow register count value should be transferred to counter 16.

When the current counter value and the reference value are not the same, an inner loop has not been completed. Control circuit 30 through output 32 selects as the output 34 of multiplexer 18 changed count value 48, and output 54 to cause OR gate 28 output 36 to right enable counter 16, thereby overwriting the previous count value with the changed count value.

In a count-down configuration, the current counter value repeatedly decrements until the current counter value and the reference values are the same. The condition of the current counter value and the reference values being the same indicates that an inner loop has been completed, and if the outer loop has not been completed as indicated by status signal 52 to control circuit 30, counter 16 should be reset to the count value stored in shadow register 22. Resetting counter 16 to the count value stored in shadow register 22 is achieved by output 50 from comparator 46 taking on a second state, such as a logic one. Control circuit 30 through output 32 selects as the output 34 of multiplexer 18 the count value of shadow register 22 received over bus 56, and output 54 causes OR gate 28 output 36 to right enable counter 16, thereby overwriting the previous or formal count value with the count value of shadow register 22.

In accordance with the invention, the reload loop counter circuit provides that a counter be reloaded with the initial count value upon counting to a predetermined reference value, such as zero. In an environment of nested loops, all loops of the outer-most loop could employ the reload loop counter technique. The loop counter reset circuit described above may be used in a manner that does not reset the counter to the initial value by utilizing a disable feature. One such disable feature could be achieved by loading the counter with a count value and subsequently loading the shadow register with a predetermined value, which may be for example either a predetermined numerical value or any negative value. The predetermined value is provided to control circuit 30 overlying 56 and detected by control circuit 30 provides no output to multiplexer 18, thereby maintaining the same counter value in counter 16.

While the invention has been described as providing the same count value to the shadow register 22 as to counter 16, the shadow register 22 can be written to independently. With both write enable counter signal, WEC, high and write enable counter shadow signal, WECS, high, the value on databus 20 is written to both counter 16 and shadow register 22. Subsequently, with write enable counter shadow signal WECS high, a different value may be written to shadow register 22. Thus, a second and subsequent setting of counter 16 to a count value can differ from the initial count setting by transferring a count value from shadow register 22 to counter 16 that differs from the initial count value provided to counter 16 from databus 20.

Repeatedly changing the value stored in shadow register 22 would provide a different count value for each inner loop execution controlled by circuit 10. However, an advantage of the invention would be overridden.

Figure 2:
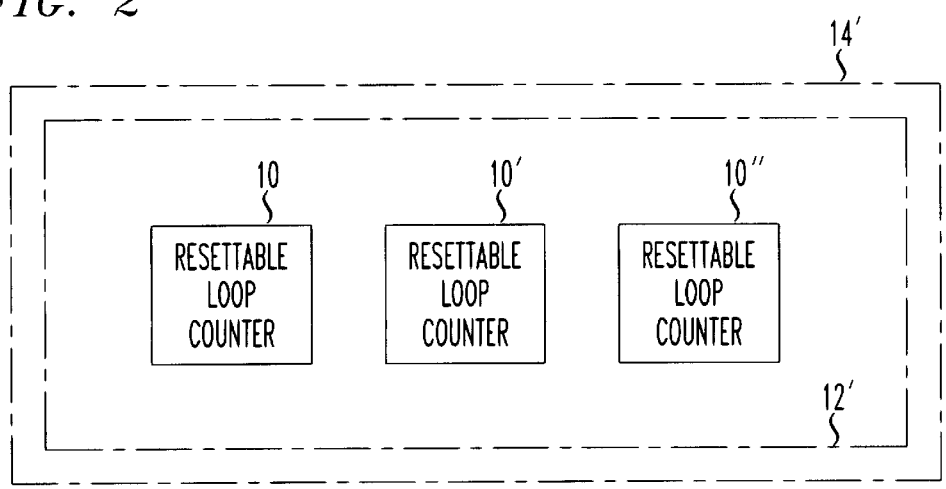
FIG. 2 is an integrated circuit employing multiple loop counter reset circuits.

Although a single reloadable loop counter circuit 10 is illustrated in integrated circuit 14 in FIG. 1, circuit 10 may be duplicated for the number of resettable counters required for any application. FIG. 2 illustrates an integrated circuit 14' having an ALU 12' with multiple resettable loop counter circuits 10'.

What is claimed is:

1. A method for reloading loop counters, comprising the steps of:
    loading an initial count value into a counter and a shadow register;
    changing a count value output from the counter by a predetermined displacement resulting in a changed count value; and
    loading the count value from the shadow register into the counter if the changed count value has reached a predetermined reference value, and otherwise loading the changed count value into the counter.

2. A method as recited in claim 1, wherein the step of changing a count value decreases the count value by the predetermined displacement.

3. A method as recited in claim 1, further comprising the step of comparing the output from the counter to a reference value to produce a comparison signal, the comparison signal indicative of whether or not the count value has reached a predetermined reference.

4. A method as recited in claim 1, wherein the displacement has unity magnitude.

5. A method as recited in claim 1, further comprising the step of:
    combining a shadow register write enable signal and a counter write enable signal to generate a signal for writing a count value from a databus to the counter.

6. A method as recited in claim 1, further comprising the step of loading a different count value into the shadow register thereby overwriting the initial count value.

7. A method as recited in claim 6, further comprising the step of:
    maintaining the count value in the counter based on the different count value in the shadow register.

8. A method as recited in claim 6, further comprising the step of:
    maintaining the count value in the counter based on a sign of the different count value in the shadow register.

9. A method of reloading loop counters comprising the steps of:
    loading an initial count value into a counter and a shadow register;
    changing an output from the counter by a predetermined displacement resulting in a changed count value; and
    loading the changed count value into the counter when the changed count value has not reached a predetermined reference value, and otherwise loading the count value from the shadow register into the counter.

10. A method as recited in claim 9, wherein the step of changing a count value decreases the count value by the predetermined displacement.

11. A method as recited in claim 9, further comprising the step of comparing the output from the counter to a reference value to produce a comparison signal, the comparison signal indicative of whether or not the count value has reached said predetermined reference value.

12. A method as recited in claim 9, wherein the displacement has unity magnitude.

13. A method as recited in claim 9, further comprising the step of:
    combining a shadow register write enable signal and a counter write enable signal to generate a signal for writing said count value from a databus to the counter.

14. A method as recited in claim 9, further comprising the step of loading a different count value into the shadow register thereby overwriting the initial count value.

15. A method as recited in claim 14, further comprising the step of:
    maintaining the count value in the counter based on the different count value in the shadow register.

16. A method as recited in claim 14, further comprising the step of:
    maintaining the count value in the counter based on a sign of the different count value in the shadow register.

17. A loop counter circuit comprising:
    a multiplexer having at least three inputs including a select input and output, the output determined by the select input;
    a counter for receiving an input and storing a count value;
    a comparator for comparing the output of the counter to a reference value, the comparator providing an output that takes on a first state when the output of the counter is not the same as the reference value, and that takes on a second state when the output of the counter is the same as the reference value;

an adder for receiving the counter output, the adder adapted to add a decrement to the counter output to provide and output that is a decreased count value;

a shadow register for storing a reset count value; and said multiplexer having a first input adapted to be coupled to the shadow register to receive the count value, a second input adapted to be coupled to a databus, and a third input adapted to be coupled to receive the adder output, the multiplexer having said select input coupled to the comparator output, such that when the output of the comparator takes on the second state, the first input to the multiplexer is selected as the output and the reset count value stored in the shadow register is transferred to the counter.

18. A circuit as recited in claim 17, further comprising:

a logic circuit coupled to receive as inputs a shadow register write enable signal and a counter write enable signal, the logic circuit for combining the write enable signals to generate an output signal for writing a count value from a databus to the counter.

19. A circuit as recited in claim 18, further comprising a control circuit, the control circuit adapted to receive the output from the logic circuit and the output from the comparator, the control circuit adapted to combine the output from the logic circuit and the output from the comparator to generate as an output a signal coupled to the select input of the multiplexer.

20. A circuit as recited in claim 19, further comprising:

a second logic block, the second logic block coupled to receive as inputs an output from the logic block and an output from the control circuit, the second logic block combining the inputs to generate a signal for writing a count value to the counter.

21. A circuit as recited in claim 17, wherein the adder is an arithmetic logic unit.

22. A circuit as recited in claim 17, wherein the circuit is an integrated circuit.

23. A circuit as recited in claim 17, wherein the circuit is a processor.

24. A circuit as recited in claim 17, wherein the circuit is a digital signal processor.

25. A circuit as recited in claim 22, wherein the integrated circuit is a digital signal processor.

* * * * *